United States Patent
Schmidt et al.

(10) Patent No.: US 6,927,357 B2
(45) Date of Patent: Aug. 9, 2005

(54) WELD GUN EQUALIZER

(75) Inventors: Kenneth R. Schmidt, Macomb, MI (US); Peter C. Sun, Rochester Hills, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/662,846

(22) Filed: Sep. 15, 2003

(65) Prior Publication Data

US 2005/0056619 A1 Mar. 17, 2005

(51) Int. Cl.$^7$ .............................................. B23K 11/10
(52) U.S. Cl. ........................................ 219/89; 219/90
(58) Field of Search .................... 219/89, 90, 86.61

(56) References Cited

U.S. PATENT DOCUMENTS

| | | | | |
|---|---|---|---|---|
| 4,825,031 A | * | 4/1989 | Heideman | 219/89 |
| 5,099,099 A | * | 3/1992 | Saito | 219/89 |
| 5,252,801 A | * | 10/1993 | Angel et al. | 219/86.61 |
| 5,739,499 A | * | 4/1998 | Suzio et al. | 219/90 |
| 6,252,193 B1 | * | 6/2001 | Umeda | 219/90 |
| 6,706,990 B1 | * | 3/2004 | Olsson | 219/86.21 |

* cited by examiner

*Primary Examiner*—Jonathan Johnson
*Assistant Examiner*—Len Tran
(74) *Attorney, Agent, or Firm*—Kathryn A. Marra

(57) ABSTRACT

A weld gun having a linkage, which relates pivotal motion of a pair of laterally opposed facing electrodes of the weld gun in a predetermined manner. Based upon the predetermined motion of the electrodes a welding robot positions the electrodes of the weld gun on opposite sides of a workpiece to be welded so that the electrodes simultaneously engage the workpiece on opposite sides.

5 Claims, 2 Drawing Sheets

WELD GUN EQUALIZER

TECHNICAL FIELD

This invention relates to spot welding guns and, more particularly, to relating motion of electrodes in a pivoting arm spot weld gun.

BACKGROUND OF THE INVENTION

Resistance welding, or spot welding, is used to join metal members, such as sheets or structures. The members to be welded are typically held together between a pair of electrodes. As the electrodes contact outer surfaces of the members, electric current passes through the members between the electrodes. The resistance of the members creates heat, which melts a portion of the members between the electrodes to form a spot weld.

When a spot weld gun is used in robotic applications, the electrodes are commonly supported by pivoting arms actuated with a pneumatic cylinder or a servo actuator. Because of mounting restraints and inertia the electrodes of the weld gun do not actuate evenly, causing the electrodes to contact one of the metal members before the other. Equalizing air cylinders and springs have been used to synchronize the motion of electrodes however, they have been unsuccessful because of inertia and the inability to properly coordinate the actuator and the equalizers.

When the electrodes contact members off centered or with unequal force, the electrodes can bend the assembly. A method of moving the electrodes in a predetermined manner so that they contact the members simultaneously at a predetermined point is desired.

SUMMARY OF THE INVENTION

The present invention provides a weld gun having a linkage which relates motion of a pair of laterally opposed facing electrodes of the weld gun in a predetermined manner. Based upon the predetermined motion of the electrodes, a welding robot can position the electrodes of the weld gun on opposite sides of a workpiece to be welded so that the electrodes simultaneously engage the workpiece on opposite sides.

The weld gun has a base mounted on a robotic arm and first and second arms supported on the base for pivotal motion about a common axis extending laterally between the arms. A pair of laterally opposed electrodes extend from the arms. An actuator pivots the arms about the base, moving the electrodes toward one another to a closed position.

The motion of the arms is coordinated by a linkage. The linkage includes a lever supported on the base of the weld gun which pivots on a second axis spaced longitudinally from the first axis and laterally between the arms. The lever has ends spaced in longitudinally opposite directions from the second axis. The linkage further includes rods extending from each end of the lever to an associated one of the arms. As the first arm is actuated, the motion of the first arm is conveyed to the second arm through the linkage so that the arms move in a predetermined manner. The linkage thus allows a single axis drive actuator to control both arms of the weld gun.

The predetermined arc of motion of the electrodes is programmed into a controller of a robotic arm so that the electrodes of the gun can be properly positioned over a wide range of structures. Based upon the predetermined arc of motion of the electrodes the robotic arm positions the electrodes so that they contact the workpiece simultaneously on opposite sides.

To correct for tolerances in the workpiece and prevent over clamping or unequal clamping of the electrodes, the rods may be connected to the arms with resilient members to give the electrodes a small degree of adjusting movement.

As the electrodes close and clamp the workpiece, current travels between the electrodes. The resistance of the workpiece creates heat that locally melts the workpiece between the electrodes to form a weld.

When larger or smaller workpieces are welded by the weld gun the robotic arm repositions the electrodes accordingly so that they engage the workpieces at a center point.

These and other features and advantages of the invention will be more fully understood from the following description of certain specific embodiments of the invention taken together with the accompanying drawings.

DESCRIPTION OF THE PREFERRED EMBODIMENT

Figure 1:
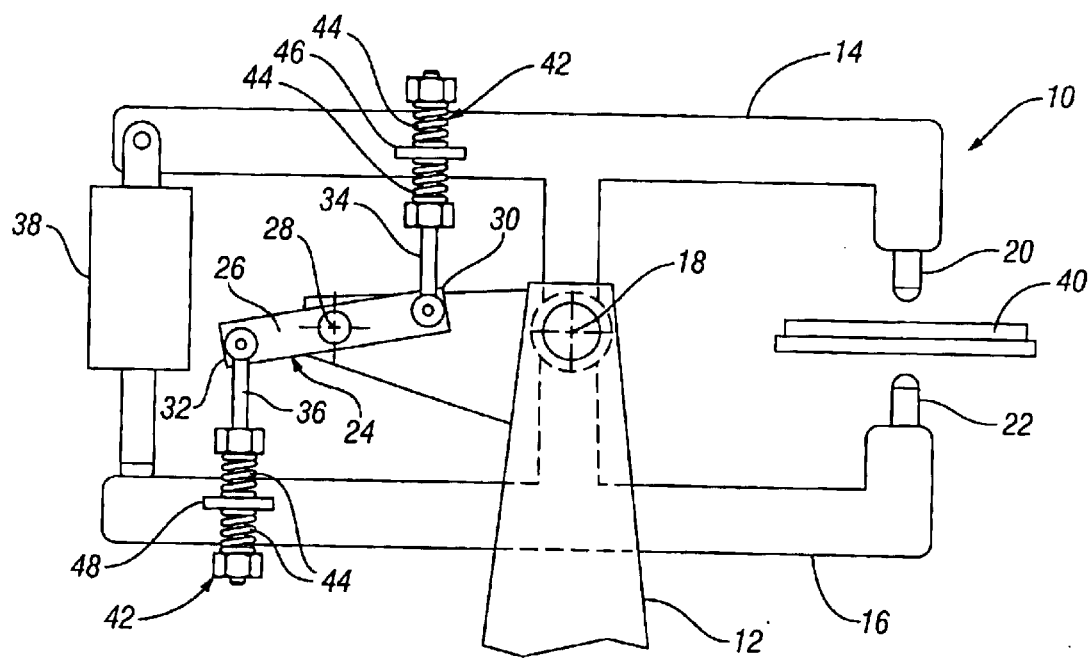
FIG. 1 is a diagrammatic view showing a weld gun having electrodes in the open position.

Referring now to FIG. 1 of the drawings in detail, numeral 10 generally indicates a weld gun having a base 12 extending from a robotic arm, not shown. First and second arms 14, 16 are supported on the base 12. The arms 14, 16 pivot about a first axis 18 of the base 12, extending laterally between the arms 14, 16. A pair of laterally opposed electrodes 20, 22 are carried on the arms 14, 16. As the arms 14, 16 pivot toward one another, the electrodes 20, 22 pivot toward one another until they engage in a closed position.

The improvement according to the present invention is a linkage 24, which relates pivotal motion of the arms 14, 16 of the weld gun 10 in a predetermined manner so that the electrodes 20, 22 engage one another at a predetermined point. In a preferred embodiment, the linkage 24 includes a lever 26 pivotally mounted on the base 12 of the weld gun 10. Lever 26 pivots on a second axis 28 spaced longitudinally from the first axis 18 and laterally between the arms 14, 16, although the pivot could be located above or below the arms, or transversely mounted having a longitudinal axis. The lever 26 has ends 30, 32 spaced in longitudinally opposite directions from the second axis 28. The linkage 24 further includes a pair of laterally extending rods 34, 36 connecting the ends 30, 32 of the lever 26 to the arms 14, 16, respectively.

A single axis actuator 38 pivots both arms 14, 16 about the first axis 18. In a preferred embodiment, the actuator 38 is mounted laterally between the arms, so that the motion of the actuator pivots both arms. Alternatively, the actuator may be positioned to only actuate one of the arms, since the linkage relates the pivoting motion of the arms.

As the actuator pivots the arms, the linkage 24 relates the pivoting motion of the arms causing the electrodes 20, 22 to pivot toward each other in a predetermined manner.

More specifically, as the electrode 20 of the first arm 14 pivots toward the electrode 22, rod 34 is pulled laterally by the pivoting motion of the first arm 14, causing the lever 26 to pivot counterclockwise and push rod 36 laterally toward the second arm 16. This correlates pivoting motion of the second arm 16 relative to the first arm 14 and the electrode 22 toward electrode 20. Thereafter, the electrode 20 of the first arm 14 pivots away from the electrode 22 of the second arm 16, rod 34 is pushed laterally toward the lever 26 which causes the lever 26 to rotate clockwise and pull rod 36 and arm 16 laterally toward the lever 26. This correlates pivoting motion of the second arm 16 with that of the first arm 14 so that the electrodes 20, 22 move away from one another in the predetermine manner.

Since the linkage 24 relates the motion of the first arm 14 to the second arm 16, the linkage 24 controls motion of the electrodes 20, 22 causing the electrodes to pivot in a predetermined relation and contact one another at a predictable center.

The ratio of movement between the arms is determined by the length of the lever 26 and the position of the rods 34, 36 relative to the arms 14, 16 and the lever 26. The length of the central lever 26 can be adjusted to allow differential travel distance between the electrodes 20, 22 or, if desired, the arms of the lever 26 can be proportional to equalize the motion of the electrodes 20, 22. However, the linkage 24 does not need to equalize the motion between the electrodes 20, 22. The linkage 24 only needs to move the electrodes 20, 22 in a predetermined relation.

Figure 2:
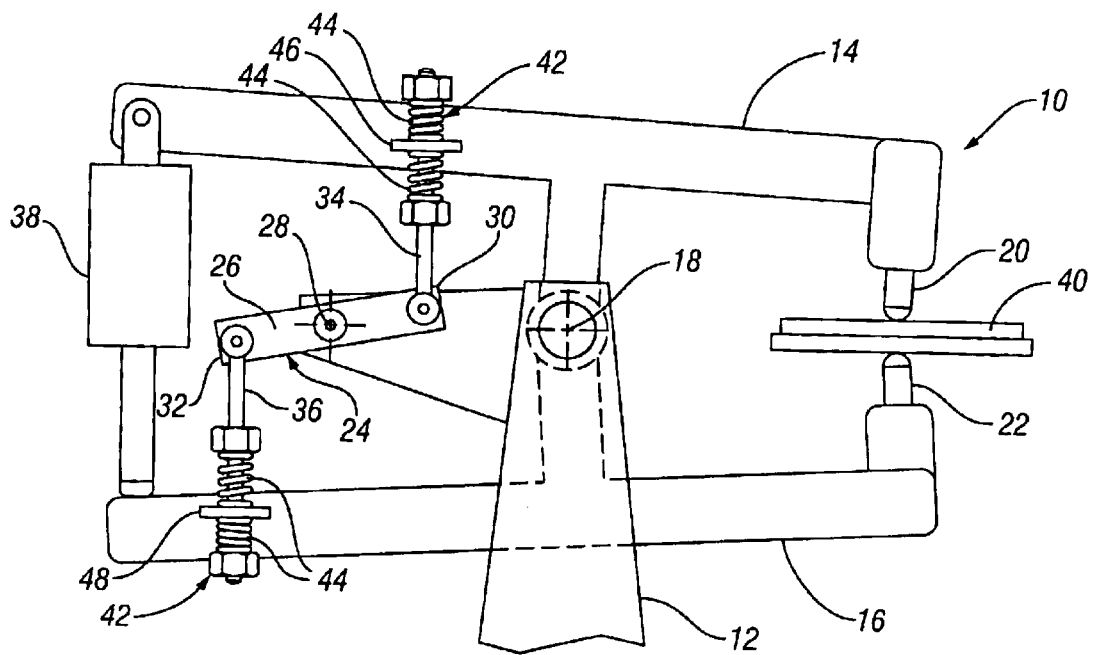
FIG. 2 is a view similar to FIG. 1 showing the weld gun electrodes in the closed position.

The predetermined relation of the electrodes 20, 22 is programmed into a controller, which determines the proper positioning of the electrodes 20, 22 during welding. The controller considers the thickness of a workpiece 40, and the predetermined relation of the electrodes 20, 22 to determine how far to space the electrodes 20, 22 from the surface of the workpiece 40 so that the electrodes 20, 22 engage the surfaces of the workpiece 40 simultaneously when the weld gun 10 is actuated to the closed position as shown in FIG. 2. As the size or shape of the workpiece 40 changes, the controller is able to recalculate the proper position of the electrodes 20, 22 and actuate the robotic arm to position the weld gun 10 so that the electrodes 20, 22 contact the workpiece 40 simultaneously on opposite sides.

To accommodate tolerances in the workpiece 40 and misalignment errors of the robotic arm, the rods 34, 36 of the linkage 24 may have resilient members 42 that act between the arms 14, 16 and the lever 26 to permit slight adjusting movement of the electrodes 20, 22.

In the preferred embodiment shown in FIG. 1 the resilient members 42 are be springs 44 extending over the rods 34, 36 near the arms. The springs 44 are retained on the rods 34, 36 on opposite sides of flanges 46, 48 extending from of the arms 14, 16 to create a resilient connection between the arms and the rods. The springs 44 compress for a small distance when the electrodes 20, 22 contact the surface of the workpiece 40 to prevent the electrodes 20, 22 from potentially bending the workpiece 40. If one of the electrodes 20, 22 contacts the workpiece 40 before the other, the springs 44 associated with the touching electrode compress, allowing the opposite electrode to continue to pivot toward the workpiece 40.

Figure 3:
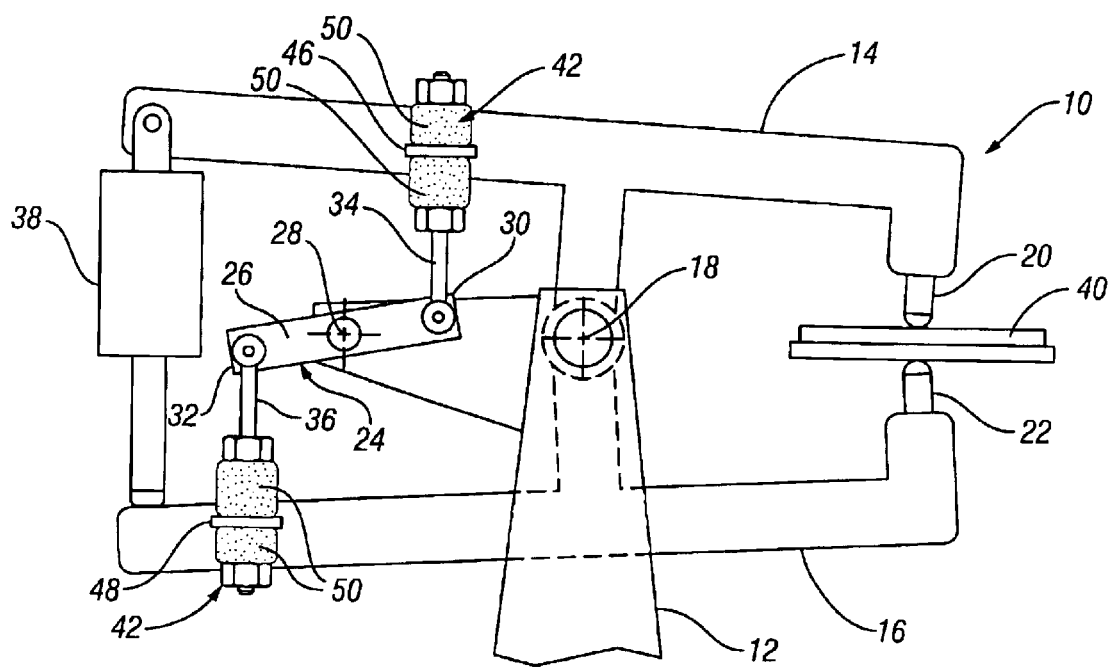
FIG. 3 is a view similar to FIG. 1 showing an alternative embodiment of weld gun linkage.

In an alternative embodiment shown if FIG. 3 the resilient members 42 are rubber bushings 50 extending over the rods. The bushings 50 are retained on the rods 34, 36 on opposite sides of flanges 46, 48 extending from the arms 14, 16 to create a resilient connection between the arms and the rods. The bushings 50 compress for a small distance when the electrodes 20, 22 contact the surface of the workpiece 40 to prevent the electrodes 20, 22 from potentially bending the workpiece 40. If one of the electrodes 20, 22 contacts the workpiece 40 before the other, the bushings associated with the touching electrode compress, allowing the opposite electrode to continue to pivot toward the workpiece 40.

In operation, the position and dimensions of a workpiece 40 are entered into the controller. Based upon the position and dimensions of the workpiece 40 and the predetermined arc path of the electrodes 20, 22, the controller determines the proper positioning for the electrodes 20, 22 relative to the workpiece 40, while the weld gun 10 is in the open position. Based upon the calculations of the controller the robotic arm positions the electrodes 20, 22 of the weld gun 10 so that when the electrodes 20, 22 pivot together they engage the workpiece 40 simultaneously.

As the electrodes 20, 22 contact the workpiece 40, the resilient members 42 allow the electrodes 20, 22 to move for a distance to correct for tolerances in the workpiece 40 or the movement of the robotic arm. When the electrodes 20, 22 engage the workpiece 40, electrical current travels from the first electrode 20 through the workpiece 40 to the second electrode 22. The resistance of the workpiece 40 converts some of the electrical energy into heat energy, which locally melts the workpiece 40 between the electrodes 20, 22 to form a weld through the workpiece 40. After the electrodes 20, 22 adequately heat the workpiece 40, they pivot to the open position. After welding the first workpiece 40, the robot may reposition the electrodes 20, 22 to weld differently sized and located workpieces.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A weld gun having a base, first and second arms supported on the base for pivotal motion about a common axis extending laterally between the arms, a pair of laterally opposed electrodes carried on the arms and engageable upon pivotable motion of the arms moving the electrodes toward one another to a closed position, and the improvement comprising:

a lever supported on the base and pivotable on a second axis spaced longitudinally from the first axis, the lever having ends spaced in opposite directions from the second axis;

the ends of the lever being connected one with each of the first and second arms; and an actuator connected to actuate at least one of the arms in a pivotal motion;

whereby actuation of said one arm is operative to pivot the lever to oppositely actuate the second arm in a predetermined manner so that the arms move the electrodes toward and away from one another; and wherein at least one of said ends of the lever is connected with an associated one of the arms through a rod and the rod connects with a resilient member that compresses to allow limited variation of the electrode closed position.

2. A weld gun having a base, first and second arms supported on the base for pivotal motion about a common axis extending laterally between the arms, a pair of laterally opposed electrodes carried on the arms and engageable upon pivotable motion of the arms moving the electrodes toward one another to a closed position, and the improvement comprising:

a lever supported on the base and pivotable on a second axis spaced longitudinally from the first axis, the lever having ends spaced in opposite directions from the second axis;

the ends of the lever being connected one with each of the first and second arms; and an actuator connected to actuate at least one of the arms in a pivotal motion;

whereby actuation of said one arm is operative to pivot the lever to oppositely actuate the second arm in a predetermined manner so that the arms move the electrodes toward and away from one another; and wherein two resilient members are connected between the lever and the first and second arms and are compressed to allowed limited variation of the electrode closed positions.

3. A weld gun having a base, first and second arms supported on the base for pivotal motion about a common axis extending laterally between the arms, a pair of laterally opposed electrodes carried on the arms and engageable upon pivotable motion of the arms moving the electrodes toward one another to a closed position, and the improvement comprising:

a lever supported on the base and pivotable on a second axis spaced longitudinally from the first axis, the lever having ends spaced in opposite directions from the second axis;

the ends of the lever being connected one with each of the first and second arms; and an actuator connected to actuate at least one of the arms in a pivotal motion;

whereby actuation of said one arm is operative to pivot the lever to oppositely actuate the second arm in a predetermined manner so that the arms move the electrodes toward and away from one another;

the weld gun including at least one resilient member, between the lever and an associated one of the arms, that compresses to allow limited variation of the electrode closed position.

4. A weld gun as in claim 1 wherein the resilient member is a spring.

5. A weld gun as in claim 1 wherein the resilient member is a rubber bushing.

* * * * *